US007062672B2

(12) United States Patent
Owhadi et al.

(10) Patent No.: US 7,062,672 B2
(45) Date of Patent: Jun. 13, 2006

(54) METHOD OF AND COMPUTER NETWORK ARRANGEMENT FOR RESTORING AN IMPAIRED SOFTWARE IMAGE

(75) Inventors: Eric Owhadi, Sassenag (FR); Jean-Francois Larvoire, Meylan (FR); Bruno Richard, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 10/163,878

(22) Filed: Jun. 7, 2002

(65) Prior Publication Data

US 2003/0005083 A1    Jan. 2, 2003

(30) Foreign Application Priority Data

Jun. 8, 2001    (EP) .................................. 01410069

(51) Int. Cl.
*G06F 11/00* (2006.01)

(52) U.S. Cl. ......................................................... 714/6
(58) Field of Classification Search .................... 714/6; 717/178

See application file for complete search history.

(56) References Cited

U.S. PATENT DOCUMENTS

| 4,335,426 | A | | 6/1982 | Maxwell et al. |
| 5,276,871 | A | | 1/1994 | Howarth |
| 5,845,090 | A | * | 12/1998 | Collins et al. ............... 709/221 |
| 5,859,969 | A | * | 1/1999 | Oki et al. .................... 709/200 |
| 6,080,207 | A | * | 6/2000 | Kroening et al. ........... 717/172 |
| 6,101,601 | A | | 8/2000 | Matthews et al. |
| 6,144,992 | A | * | 11/2000 | Turpin et al. ............... 709/208 |
| 6,163,859 | A | * | 12/2000 | Lee et al. ...................... 714/38 |
| 6,259,442 | B1 | * | 7/2001 | Britt et al. ................... 715/721 |
| 6,330,715 | B1 | * | 12/2001 | Razzaghe-Ashrafi ........ 717/171 |
| 6,360,366 | B1 | * | 3/2002 | Heath et al. ................. 717/178 |
| 6,457,175 | B1 | * | 9/2002 | Lerche ........................ 717/173 |
| 6,519,762 | B1 | * | 2/2003 | Colligan et al. ............ 717/170 |
| 6,725,453 | B1 | * | 4/2004 | Lucas et al. ................. 717/178 |
| 6,735,601 | B1 | * | 5/2004 | Subrahmanyam ........... 707/200 |
| 2002/0026634 | A1 | * | 2/2002 | Shaw .......................... 717/173 |

FOREIGN PATENT DOCUMENTS

| EP | 0 854 423 A1 | 7/1998 |
| WO | WO 98/47057 A2 | 10/1998 |

* cited by examiner

Primary Examiner—Bryce P. Bonzo

(57) ABSTRACT

An impaired software image associated with a first networked computer is restored by generating a software image request that identifies the software image and the first computer. The software image request is passed to plural other computers on the network. If one of the other computers has the image, the other computer supplies the image to the first computer to restore the impaired image.

18 Claims, 2 Drawing Sheets

METHOD OF AND COMPUTER NETWORK ARRANGEMENT FOR RESTORING AN IMPAIRED SOFTWARE IMAGE

DESCRIPTION OF AN BACKGROUND TO INVENTION

This invention relates to a method of restoring an impaired software image and to a computer network arrangement.

Particularly, although not exclusively, the invention relates to a method of restoring an impaired software image which is associated with a networked computer, which method obviates the requirement to use standard recovery tools such as recovery CD's/DVD's, dedicated (Intranet or Internet) recovery file servers and the need to occupy substantial parts of local data stores such as a hard disk.

As will be appreciated, data recovery using specific recovery disks such as CD's and DVD's, although effective in broad terms, inevitably requires that the recovery disk be available, and dictates, in addition, that the computer in need of support be associated with an appropriate CD/DVD drive.

Although, as an alternative, it is possible to maintain, locally, a computer copy of important software components, by using an unoccupied hard disk partition, for example, this uses a large amount of data storage space, which could be better used for other purposes.

Other proposals, such as Rembo Technology SARL's "REMBO" Operating System makes use of a dedicated server which, in the event of a software failure, can supply appropriate restoration instructions to the networked computer concerned. However, servers of this type are expensive to install and to maintain, and this proposal is thus commercially unviable in many situations.

It is thus an object of the present invention to provide an improved method of restoring an impaired software image and to provide an improved computer network arrangement which enables this process to be effected.

SUMMARY OF THE INVENTION

According to a first aspect of the present invention, there is provided a method of restoring an impaired software image associated with a first networked computer, comprising:
a) identifying the impaired software image,
b) generating a software image request, the software image request identifying the software image and the first computer,
c) passing the software image request to a plurality of other computers on the network and, in the event that one of said plurality of other computers is provided with the image,
d) supplying the image from said one other computer to the first computer to enable the impaired image to be restored.

The software image request may be passed substantially simultaneously to the plurality of other computers.

Alternatively, the software image request may be passed sequentially to the plurality of other computers, until the request reaches a computer provided with the image.

In this way, the software image request may be passed from computer to computer until a software image is found which will enable the impaired image to be restored. It will also be understood that especially in the case of a corporate network environment, a very large degree of software "overlap" will exist, in that the vast majority of the software applications being run by a given networked computer will also be present on at least one other computer on the network.

Thus, in such circumstances, there exists a high probability that the required software image can be found on one of the other networked computers, thus obviating, for example, the use of a dedicated recovery CD or DVD.

In the event that the software image request is passed to a computer which is not provided with the image, that computer may return or effect returning of all appropriate "NO" response to the first computer.

Passing the software image request to the plurality of computers may initiate a timeout count.

Termination of the timeout count may occur upon receipt by the first computer of the software image or on expiry of a predetermined timeout period.

In the event that each computer on the network has returned a "NO" response, an advisory message may be conveyed to a user of the first computer.

During normal use of the first computer, the first computer may maintain a software inventory, detailing the software associated with it, the software image request including information obtained from the software inventory.

The software inventory may be maintained in a dedicated non-volatile data store, separate from the main data store used during operation of the computer.

Preferably, tile separate data store is a separate partition of the first computer's hard disk.

The software inventory preferably is a differential inventory, in that only changes to the inventory are recorded.

The restoration process preferably is effected without substantive server involvement, in that the first computer and the computer supplying the software image have a substantially peer-to-peer relationship.

In the event that each "peer" computer on the network has returned a "NO" response, the first computer may pass the software image request to a restoration or recovery server.

In accordance with a second aspect of the present invention, there is provided a computer network arrangement having:
a) a plurality of networked computers,
b) an impaired software image identifier, operative to identify an impaired software image on a first networked computer,
c) a software image request generation module, operative to generate a software image request which identifies the software image and the first computer,
d) a software image request dispatch module, operative to pass the software image request to a plurality of other computers on the network, and
e) a software image supply module, which, in the event that one of said plurality of the other networked computers is provided with the requested image, is operative to supply the image to the first computer to enable the impaired software image to be restored.

The impaired software image identifier preferably comprises a hardware/software module.

The networked computers preferably have a substantially peer-to-peer relationship.

BRIEF DESCRIPTION OF THE DRAWINGS

The invention will now be described in greater detail, but strictly by way of example only, by reference to the accompanying drawings, of which.

BEST MODE OF THE INVENTION

Figure 1:
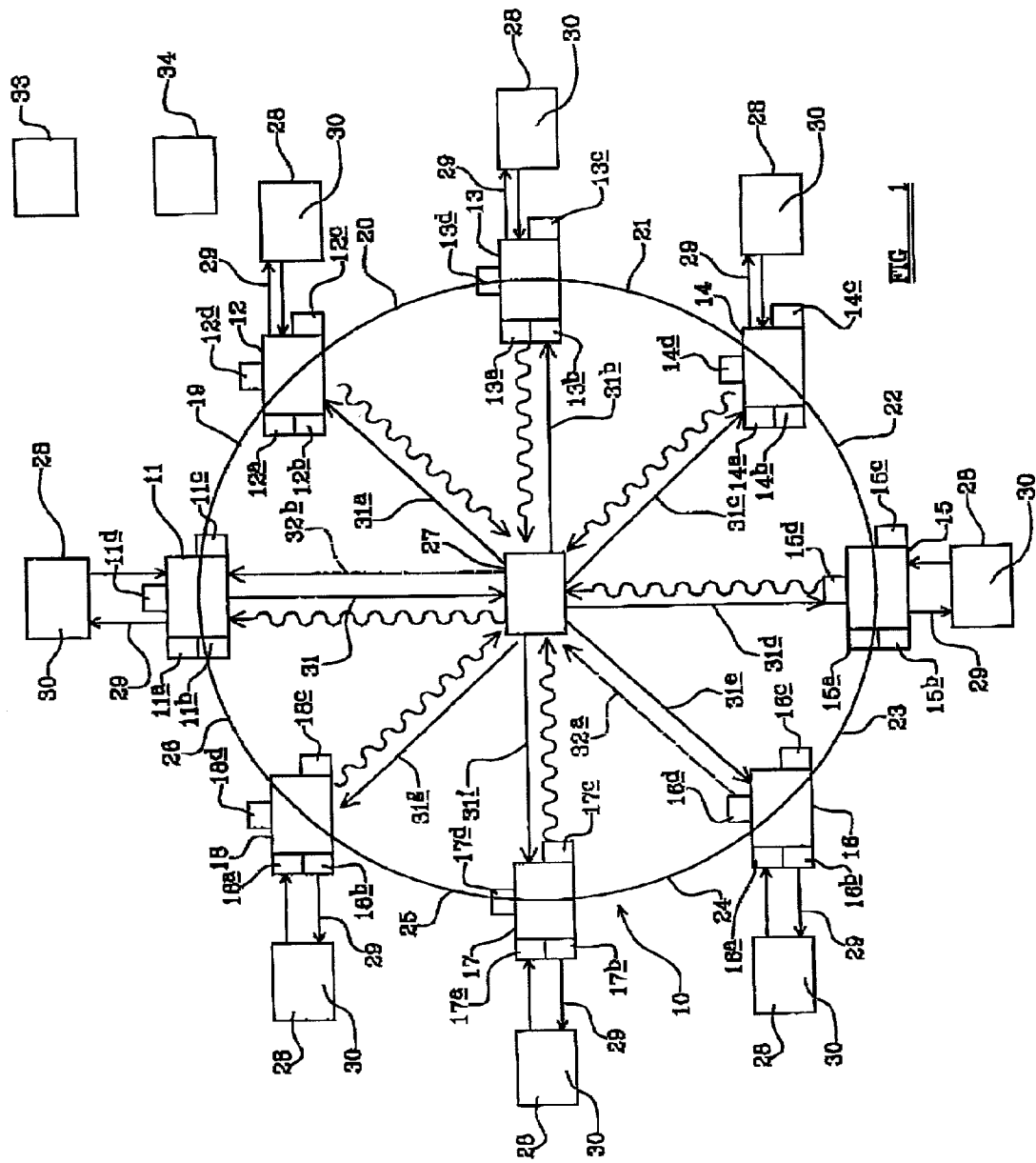
FIG. 1 is a schematic illustration of how the restoration method can be put into practice on a hub-assisted ring network.

Referring first to FIG. 1, the hub-assisted ring network 10 comprises eight networked PC's 11, 12, 13, 14, 15, 16, 17 and 18 linked to each other via standard ring network communication lines 19, 20, 21, 22, 23, 24, 25 and 26. In addition, a central hub 27 is provided, through which PC-to-PC data can be passed. The hub 27, however, acts purely in this example as a router, in that it does not offer any data serving capability.

During normal (i.e. unimpaired) operation, each PC generates a software inventory 28. Although each PC may, as explained below, function in the same or a similar way, the invention will be described on the basis that PC 11 has an impaired software image. During normal use, the PC 11 (conveniently using its installed Operating System) sends inventory commands 29 to a non-volatile data store 30 which is separate from the main data store used during operation of the PC 11. The separate data store, in this example, is an unused partition of the PC's hard disk. Using the information received from the commands 29, a software inventory is built up, representing a listing of the software applications currently been used (or stored within, and currently not being used) by the PC 11.

To save space in the non-volatile data store 30, the software inventory built up preferably constitutes a differential inventory, in that only changes to previous versions of the inventory are recorded.

Differential backup of this type is known in itself, and will not therefore be described here in any great detail. However, for reasons of clarity, it should be understood that differential backup is effective to store software image differences, such as differences which may exist between an extant software image and a basic "manufactured" image corresponding to the original state of the software concerned. As will be appreciated, such differential backup enables a "snapshot" of a software image to be obtained, without requiring an entire copy of the software concerned to be maintained in the non-volatile data store 30.

In the event of loss, damage or corruption (henceforth referred to generally as "impairment") to a software image contained within the PC 11, the PC 11 identifies, using an image identification module 11a, the impaired software image.

The PC 11, using an image request generation module 11b, then generates a software image request which identifies the software image and PC concerned, and dispatches this, using an image request dispatch module 11c, to the hub 27.

Image identification, request generation and request dispatch modules for the other PC's on the network are shown at 12a to 18a 12b to 18b and 12c to 18c. The incoming request 31 is then passed simultaneously (or substantially simultaneously) to each of the other PC's 12 to 18 on the network, with the forwarded requests being shown at 31a, 31b, 31c, 31d, 31e, 31f and 31g.

If the "recipient" PC's of the various forwarded requests 31a to 31g do not include the requested image, a "NO" response is generated and dispatched, via the hub 27, back to the PC 11. In this way, the PC 11 knows that the required image cannot be obtained from that other PC. The "NO" requests are illustrated by wavy arrows, for the sake of clarity.

However, should one of the remaining PC's include the required software image, the image is then supplied to the PC 11, via the hub 27, using a software image supply module 16d. This is illustrated by the dotted lines 32a and 32b with the image originating from PC 16 on the network.

Software image supply modules associated with the other PC's on the network are shown at 11d, 12d, 13d, 14d, 15d, 17d and 18d.

To facilitate identification of the "requestor" PC, the software image request 31 contains, in this example, the IP Network address of the PC 11.

Although, in the example shown in FIG. 1, one of the PC's (the PC 16) is able to supply tie PC 11 with the required software image, it will be appreciated that this may not always be the case. Under such circumstances, the PC 16, in addition to the PC's 12, 13, 14, 15, 17 and 18, would dispatch a "NO" response, meaning that the PC 11 would receive such "NO" responses from each of the PC's 12 to 18. Should this occur, the PC 11 is operative to generate an appropriate advisory message to a user thereof, to inform the user that the required software image is not available from the PC's 12 to 18 situated on the local network 10. In view of this, an alternative restoration strategy will thus be required, and the user may thus attempt to do this using a recovery CD/DVD, or by obtaining the required software image from an Intranet server 33 or an Internet server 34, in generally conventional manner. This, however, is not strictly part of the present invention.

In the event that more than one of the PC's is able to supply the PC 11 with the required software image, a plurality of software images may be supplied to the PC 11. It will be appreciated that this activity is superfluous, and the PC 11, under such circumstances, may be arranged to generate and dispatch an appropriate "DECLINE" response to all but one of said other PC's.

As will be appreciated from the foregoing, the recovery process of the invention does not rely upon the provision of any "standard" recovery apparatus such as recovery CD's, DVD's, Intranet servers or Internet servers, but instead operates on tie basis that in a LAN environment, it is probable that one of the other, functioning, PC's will be provided with the required software image. Thus, it will be appreciated that the present invention operates on the basis that the PC's involved have something of a "peer-to-peer" relationship, in that the recovery image is obtained from a networked PC having the same or a similar level of importance on the network. This of course contrasts quite clearly with a client/server configuration which attracts far greater costs.

It should be understood, however, that the words "peer-to-peer" are used in this specification simply to explain the substantially non-hierarchical relationship that exists between the networked PC's 11 to 18.

FIG. 1 illustrates a software image restoration process in which the software image request is forwarded substantially simultaneously to each of the other PC's on the network. If the required image is available from any one of such other PC's, proceeding in this way is likely to result in the image being supplied to the requestor PC 11 fairly quickly, although it results in increased traffic through the hub 27, which may slow the throughput of other network information.

Figure 2:
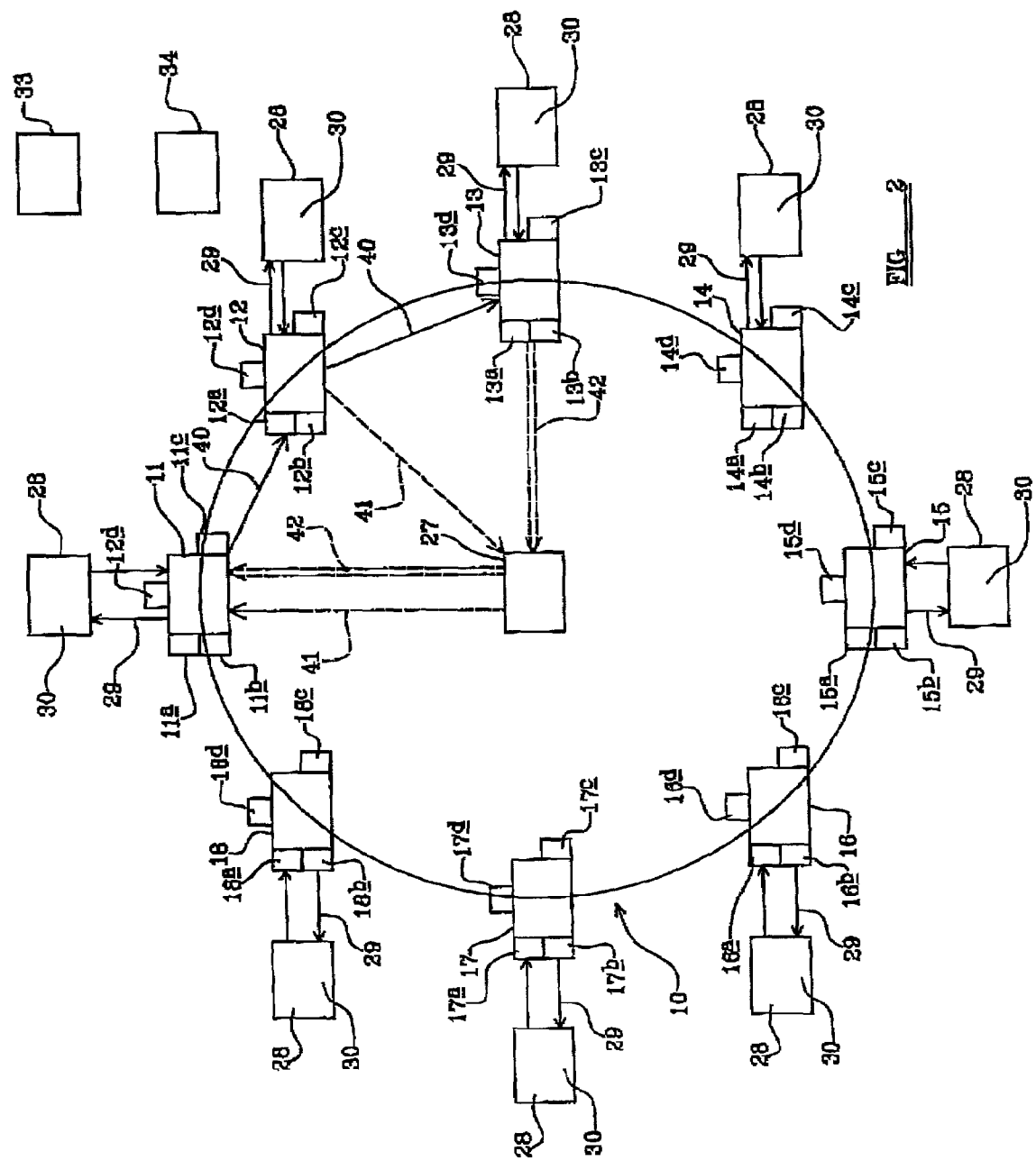
FIG. 2 is a somewhat similar illustration of a hub-assisted network, showing an alternative way in which the restoration method can be effected.

To alleviate this, sequential passing of the software image request is also envisaged, as shown in FIG. 2.

As the hardware components of FIG. 2 are substantially identical to those of FIG. 1, corresponding reference numerals have been used.

However, the way in which the process operates is different, as follows.

Upon detection of an impaired software image, the PC 11 dispatches a software image request 40 to a neighbouring PC 12, which then determines whether it is provided with the required image. If it is not so provided, a "NO" response 41 is dispatched to the hub 27 for forwarding to the PC 11. It will be appreciated that the "NO" response 41 could also be sent direct from the PC 12 to the PC 11, obviating the involvement of the hub 27.

Either way, the generation and dispatch of a "NO" response has the effect of forwarding the software image request 40 to the next available neighbouring PC 13, which then determines the availability or otherwise of the required software image, in the same way as the PC 12. In this example, the PC 13 is provided with the requested image, and the image 42 is thus supplied, via the hub 27, to the PC 11, to enable the recovery/restoration process to be concluded. It will be appreciated that by passing the software image request 40 sequentially from PC to PC, the data traffic through the hub 27 is minimised, thus expediting the flow of other data which may exist therethrough. Similarly, the PC's 14 to 18 are not thus involved in the restoration process, allowing them to continue operating in an unhindered manner.

Whilst, in the preceding description, identification of the impaired software image is effected substantially without user input, in that a software image identifier, in the form of a hardware/software identification module, is used, it will be appreciated that this need not necessarily be the case. Thus, the applicants envisage situations where the identity of the impaired software image is readily apparent to the user, thus enabling the user to generate and dispatch the software image request of his/her own volition.

Situations such as this could occur, for example, where a specific file is required by the user, and where the user knows that the file was available—unimpaired—at a particular point in the past.

It will be appreciated from the foregoing that the invention also provides for an arrangement whereby a plurality of impaired software images can be sought, on a "file-by-file" basis. Thus, where restoration of an impaired image requires a number of different files, the invention can be used to seek these files from a plurality of different peers, with each file being sought generally in the manner previously described.

It will also be understood by those skilled in the art that the network configuration shown in FIGS. 1 and 2 is intended simply to illustrate how the invention can be used, in practice. With this in mind, it will be understood that many other network configurations may be suitable, and that the particular layout of FIGS. 1 and 2 is in no way intended to limit the scope of the protection sought by the applicants.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of restoring an impaired software image associated with a first networked computer of a network, including at least several network computers, comprising:
   determining, at the first computer, that the software image is impaired,
   generating, by the first computer, a software image request, the image request identifying the software image of the first computer that has been determined to be impaired and the first computer,
   passing, by the first computer, the image request to plural computers in the network,
   if the other computer in the network has the image in unimpaired form, restoring the impaired image of the first computer to unimpaired form by supplying the image in unimpaired form from said another computer to the first computer,
   and supplying the image in unimpaired form to the first computer from one of the plural computers having the unimpaired image,
   the image request being passed substantially simultaneously to the plural computers, one of the plural computers being the another computer including the unimpaired image.

2. A method of restoring an impaired software image associated with a first networked computer of a network, including at least several network computers, comprising:
   determining, at the first computer, that the software image is impaired,
   generating, by the first computer, a software image request, the image request identifying the software image of the first computer that has been determined to be impaired and the first computer,
   passing, by the first computer, the image request to plural computers in the network,
   if the other computer in the network has the image in unimpaired form, restoring the impaired image of the first computer to unimpaired form by supplying the image in unimpaired form from said another computer to the first computer,
   and supplying the image in unimpaired form to the first computer from one of the plural computers having the unimpaired image,
   the image request being passed substantially to the plural computers until the request reaches the another computer including the unimpaired image.

3. A method according to claim 2, wherein the another computer supplies the image in unimpaired form to the first computer via a central hub that can communicate with all the plural computers and the first computer.

4. A method of restoring an impaired software image associated with a first networked computer of a network, including at least several network computers, comprising:
   determining, at the first computer, that the software image is impaired,
   generating, by the first computer, a software image request, the image request identifying the software image of the first computer that has been determined to be impaired and the first computer,
   passing, by the first computer, the image request to plural computers in the network,
   if the other computer in the network has the image in unimpaired form, restoring the impaired image of the first computer to unimpaired form by supplying the image in unimpaired form from said another computer to the first computer,
   and supplying the image in unimpaired form to the first computer from one of the plural computers having the unimpaired image,
   in the event of the request is being passed to a computer which does not have the unimpaired image, that computer causes an appropriate "NO" response to be returned to the first computer.

5. A method according to claim 4, wherein in the event the request is passed to a computer which does not have the unimpaired image, that computer causes an appropriate "NO" response to be returned to the first computer, and including conveying an advisory message to a user of the first computer if each computer on the network has returned a "NO" response.

6. The method of claim 4, further including
causing the first computer to pass the software image request to a restoration or recovery server if each computer on the network has returned a "NO" response, a "NO" response being generated by a computer which does not have the unimpaired image.

7. A method of restoring an impaired software image associated with a first networked computer of a network, including at least several network computers, comprising:
determining, at the first computer, that the software image is impaired,
generating, by the first computer, a software image request, the image request identifying the software image of the first computer that has been determined to be impaired and the first computer,
passing, by the first computer, the image request to plural computers in the network,
if the other computer in the network has the image in unimpaired form, restoring the impaired image of the first computer to unimpaired form by supplying the image in unimpaired form from said another computer to the first computer,
and supplying the image in unimpaired form to the first computer from one of the plural computers having the unimpaired image,
initiating a timeout count by passing the software image request to the plural computers.

8. A method according to claim 7, wherein termination of the timeout count occurs upon receipt by the first computer of the software image or upon expiry of a predetermined timeout period.

9. A method of restoring an impaired software image associated with a first networked computer of a network, including at least several network computers, comprising:
determining, at the first computer, that the software image is impaired,
generating, by the first computer, a software image request, the image request identifying the software image of the first computer that has been determined to be impaired and the first computer,
passing, by the first computer, the image request to plural computers in the network,
if the other computer in the network has the image in unimpaired form, restoring the impaired image of the first computer to unimpaired form by supplying the image in unimpaired form from said another computer to the first computer,
and supplying the image in unimpaired form to the first computer from one of the plural computers having the unimpaired image,
during normal use of the first computer, causing the first computer to maintain a software inventory detailing software associated therewith, the software image request including information obtained from the software inventory.

10. A method according to claim 9, wherein the software inventory is maintained in a dedicated, non-volatile data store, separate from the main data store used during operation of the computer.

11. A method according to claim 9, wherein the software inventory is maintained in a separate partition of the first computer's hard disk.

12. A method according to claim 9, wherein the software inventory is a differential inventory.

13. A method of restoring an impaired software image associated with a first networked computer of a network, including at least several network computers, comprising:
determining, at the first computer, that the software image is impaired,
generating, by the first computer, a software image request, the image request identifying the software image of the first computer that has been determined to be impaired and the first computer,
passing, by the first computer, the image request to plural computers in the network,
if the other computer in the network has the image in unimpaired form, restoring the impaired image of the first computer to unimpaired form by supplying the image in unimpaired form from said another computer to the first computer,
and supplying the image in unimpaired form to the first computer from one of the plural computers having the unimpaired image,
the first computer and the computer supplying the image in unimpaired form having substantially peer-to-peer relationship, and performing the method without substantive server involvement.

14. A method according to claim 13, further including causing the first computer to pass the software image request to a restoration or recovery server if each peer computer on the network has returned a "NO" response, a "NO" response being generated by a computer which does not have the unimpaired image.

15. A computer network arrangement having:
a) plural networked computers,
b) a first networked computer including an impaired software image identification module for identifying an impaired software image on the first networked computer,
c) the first networked computer including an image request generation module coupled to be responsive to the impaired software image identification for responding to an indication of the identified impaired software image by generating an image request that identifies the impaired software image and the first computer,
d) the first networked computer including an image request dispatch module for passing the software image request to another computer on the network, and
e) the first networked computer including a software image supply module which, in the event said another networked computer has the requested image, is operative to supply the image from said another networked computer to the first computer for causing the impaired software image of the first computer to be replaced by the software image of the another computer,
the plural networked computers having a substantially peer-to-peer relationship.

16. A computer network arrangement according to claim 15, wherein the network includes at least several computers and the image request dispatch module is arranged for passing the software request to plural other computers on the network.

17. A computer network arrangement having:
a) plural networked computers,
b) a first networked computer including an impaired software image identification module for identifying an impaired software image on the first networked computer,
c) the first networked computer including an image request generation module coupled to be responsive to the impaired software image identification for responding to an indication of the identified impaired software image by generating an image request that identifies the impaired software image and the first computer,
d) the first networked computer including an image request dispatch module for passing the software image request to another computer on the network, and
e) the first networked computer including a software image supply module which, in the event said another network computer has the requested image is a operative to supply the image from said another networked computer to the first computer for causing the impaired software image of the first computer to be replaced by the software image of the another computer, the network including a central hub coupled with the image request dispatch module, the central hub being arranged for substantially simultaneously passing the software image request to others of said plural networked computers.

18. A computer network arrangement having:
a) plural networked computers,
b) a first networked computer including an impaired software image identification module for identifying an impaired software image on the first networked computer,
c) the first networked computer including an image request generation module coupled to be responsive to the impaired software image identification for responding to an indication of the identified impaired software image by generating an image request that identifies the impaired software image and the first computer,
d) the first networked computer including an image request dispatch module for passing the software image request to another computer on the network, and
e) the first networked computer including a software image supply module which, in the event said another networked computer has the requested image, is operative to supply the image from said another networked computer to the first computer for causing the impaired software image of the first computer to be replaced by the software image of the another computer,
wherein the first networked computer is arranged for causing the first computer to pass the software image request to a restoration or recovery server if each computer on the network has returned a "NO" response, a "NO" response being generated by a computer which does not have the unimpaired image.

* * * * *